(12) United States Patent
Johnson et al.

(10) Patent No.: US 7,419,606 B2
(45) Date of Patent: Sep. 2, 2008

(54) SELENIUM REMOVAL PROCESS

(75) Inventors: Marvin Johnson, Bartlesville, OK (US); Charles J. Lord, III, Bartlesville, OK (US); Larry E. Reed, Bartlesville, OK (US); Kenneth C. McCarley, Bartlesville, OK (US); Glenn W. Dodwell, Bartlesville, OK (US); Tin Tack Peter Cheung, Kingwood, TX (US); John Cruze, Sugar Land, TX (US); Richard Anderson, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/639,817

(22) Filed: Dec. 15, 2006

(65) Prior Publication Data

US 2008/0142446 A1  Jun. 19, 2008

(51) Int. Cl.
*C02F 1/58* (2006.01)
(52) U.S. Cl. .................. 210/752; 210/757; 210/763; 210/904; 210/911; 423/509
(58) Field of Classification Search .................. 210/911
See application file for complete search history.

(56) References Cited

U.S. PATENT DOCUMENTS

| | | | |
|---|---|---|---|
| 4,405,464 A | 9/1983 | Baldwin et al. | 210/717 |
| 4,806,264 A | 2/1989 | Murphy | 210/695 |
| 4,915,928 A | 4/1990 | Marcantonio | 423/510 |
| 4,940,549 A | 7/1990 | Olsen et al. | 210/695 |
| 5,200,082 A | 4/1993 | Olsen et al. | 210/667 |
| 5,264,133 A * | 11/1993 | Forschner et al. | 210/670 |
| 5,494,582 A | 2/1996 | Goodman | 210/631 |
| 5,510,040 A | 4/1996 | Miller et al. | 210/721 |
| 5,601,721 A * | 2/1997 | Lukasiewicz et al. | 210/670 |
| 5,603,838 A | 2/1997 | Misra et al. | 210/665 |
| 5,993,667 A | 11/1999 | Overman | 210/709 |
| 6,090,290 A | 7/2000 | Goodman et al. | 210/666 |
| 6,093,328 A * | 7/2000 | Santina | 210/679 |
| 6,156,191 A | 12/2000 | Overman | 210/96.1 |
| 6,214,238 B1 | 4/2001 | Gallup | 210/717 |
| 6,235,204 B1 | 5/2001 | Castaldi et al. | 210/719 |
| 6,251,283 B1 | 6/2001 | Centofanti et al. | 210/721 |
| 6,558,556 B1 * | 5/2003 | Khoe et al. | 210/758 |
| 6,914,034 B2 * | 7/2005 | Vo | 502/406 |
| 6,994,792 B2 * | 2/2006 | Schlegel | 210/660 |
| 2004/0089608 A1 | 5/2004 | Vo | 210/688 |
| 2005/0059549 A1 | 3/2005 | Vo | 502/406 |
| 2005/0079114 A1 | 4/2005 | Dubrovsky | 423/1 |
| 2005/0093189 A1 | 5/2005 | Vo | 264/29.1 |

OTHER PUBLICATIONS

MERSORB® LW Product Data sheet, Selective Adsorption Associates, Inc., found at http://selective adsorption.com/mersorblw.htm, date unavailable.
Nucon International Inc. Bulletin 11 B28—Aug. 2004, MERSORB® Mercury Adsorbents Design and Performance Characteristics.

* cited by examiner

*Primary Examiner*—Peter A. Hruskoci
(74) *Attorney, Agent, or Firm*—Jeffrey A. Anderson

(57) ABSTRACT

A process for removing selenium from an aqueous stream using a supported sulfur material, and optionally the addition of an activating agent for enhanced removal of selenite, is disclosed.

22 Claims, No Drawings

SELENIUM REMOVAL PROCESS

The invention relates to an improved process for removing selenium from a water stream. More particularly, the invention relates to the use of a composition containing sulfur and a porous support for the removal of selenium from a water stream.

SUMMARY OF THE INVENTION

In accordance with this invention, a process for removing selenium from a water stream is provided which includes contacting a feed stream comprising water and a selenium compound with a composition comprising sulfur and a porous support for removal of at least a portion of the selenium compound from the feed stream thereby forming a treated stream comprising less selenium than the feed stream.

DETAILED DESCRIPTION OF THE INVENTION

The feed stream of the current invention can be any aqueous stream containing selenium from a source such as, but not limited to, a petroleum refinery, or a mining operation, or the runoff from an irrigation stream which has contacted selenium containing soil, or a power plant and is most typically a wastewater stream from a petroleum refinery. The feed stream typically comprises water and a selenium compound. The selenium compound is typically selected from the group consisting of selenite, selenocyanate, selenate, hydrogen selenide, selenium, and combinations thereof. The feed stream typically comprises at least about 3000 ppb selenium, more typically at least about 1000 ppb selenium, on an elemental selenium basis. The feed stream can also comprise, consist of, or consist essentially of water, selenium compounds and contaminants selected from the group consisting of thiosulfate, thiocyanate, chloride, sulfate, sulfite, hydrogen sulfide, organics, phenolics, and combinations thereof.

The feed stream is contacted with a composition comprising, consisting of, or consisting essentially of, sulfur and a porous support for removal of at least a portion of the selenium compound from the feed stream thereby forming a treated stream comprising less selenium than the feed stream.

The porous support is selected from the group consisting of an inorganic oxide, carbon and combinations thereof, and more preferably is selected from the group consisting of alumina, carbon and combinations thereof. Most preferably, the porous support is carbon.

The feed stream is contacted with a sufficient quantity of the composition such that the treated stream contains less than or equal to about 30 wt. %, preferably less than or equal to about 20 wt. %, more preferably less than or equal to about 5 wt. %, of the selenium contained in the feed stream, on an elemental selenium basis.

The concentration of sulfur of the composition is in the range of from about 1 to about 60 wt. %, preferably from about 10 to about 30 wt. %.

The temperature at which the feed stream is contacted with the composition is in the range of from about 20° C. to about 100° C., preferably from about 30° C. to about 80° C.

When at least about 70 wt. %, preferably at least about 80 wt. %, on an elemental selenium basis, of the selenium compound is selenite, the contacting with the composition is preferably in the presence of an activating agent.

The activating agent can be selected from the group consisting of ammonium sulfite, sodium sulfite, potassium sulfite, $H_2SO_3$, sulfur dioxide, and combinations thereof.

When at least about 70 wt. %, preferably at least about 80 wt. %, on an elemental selenium basis, of the selenium compound is selenocyanate the feed stream is preferably contacted with the composition at a pH between about 1 to about 8.5, and more preferably a pH between about 3 to about 5.

When at least about 70 wt. %, preferably at least about 80 wt. %, on an elemental selenium basis, of the selenium compound is selenocyanate, and when the feed stream is too basic, the pH can be adjusted by adding an acid selected from the group consisting of sulfuric acid, $SnCl_2$, $FeCl_2$, $AlCl_3$ and combinations thereof, prior to contacting the feed stream with the composition.

Further, when at least about 70 wt. %, preferably at least about 80 wt. %, on an elemental selenium basis, of the selenium compound is selenocyanate, the feed stream preferably comprises less than or equal to about 20 ppb, more preferably less than or equal to about 10 ppb, oxygen when contacted with the composition.

When at least about 70 wt. %, preferably at least about 80 wt. %, on an elemental selenium basis, of the selenium compound is selenocyanate, and the feed stream further comprises a contaminant selected from the group consisting of thiosulfate, thiocyanate, chloride, sulfate, sulfite, organics, phenolics and combinations thereof; the contacting is preferably at a temperature in the range of from about 50° C. to about 100° C., more preferably from about 65° C. to about 100° C., and at a pH between about 2 to about 4, more preferably about 2 to about 3.

EXAMPLES

The following examples illustrate the effectiveness of the inventive process for removing selenium from an aqueous stream.

Example 1 pH Adjustment in Presence of Contaminants

Aqueous selenium containing feeds, having the concentrations shown in Table 1, were contacted with a sulfur/carbon material (about 13 wt. % sulfur) obtained from Nucon International, Inc. referred to as MERSORB®-LW.

TABLE 1

| Feed | Thiocyanate (ppm) | Thiosulfate (ppm) | Selenocyanate (ppm) | Se Removal Efficiency after 20 hrs on stream (%) |
|---|---|---|---|---|
| 1 | 31 | 21 | 1.1 | ~22 |
| 2 | 31 | 21 | 1.1 | ~53 |
| 3 | 31 | 21 | 1.1 | ~74 |

The feedstream velocity was 3.0 GPM/ft.$^2$ with a LHSV of 29.3 hr.$^{-1}$. The temperature was about 70° C. and the particle size of the sulfur/carbon material was about 0.9 mm. For Feed #1 the pH was about 8.5 when contacted with the sulfur/carbon material. For Feed #2 the pH was lowered to about 2.5 prior to contact with the sulfur/carbon material using sulfuric acid. For Feed #3 stannous chloride was added to the feed stream to a concentration of about 100 ppm $SnCl_2$ prior to contact with the sulfur/carbon material.

As can be seen, the reduction of the pH of the feedstream had a significant impact on the selenium removal efficiency when the feedstream also contained thiocyanate and thiosulfate contaminants.

Example 2

A sample of a sour water stream was contacted with a sulfur/alumina material (about 20 wt. % sulfur) after addition of a quantity of ammonium sulfite. The sour water feed contained about 2010 ppb selenium.

The selenium concentrations of the treated stream are set out in Table 2 below.

TABLE 2

| Time on Stream | Se (ppb) |
| --- | --- |
| 1 hr | 39 |
| 2 hrs | 28 |
| 3 hrs | 27 |
| 4 hrs | 33 |
| 5 hrs | 41 |
| 6 hrs | 37 |
| 7 hrs | 19 |
| 8 hrs | 28 |
| 9 hrs | 28 |
| 10 hrs | 15 |

As can be seen from Table 2 above, the sulfur/alumina material proved effective in removing selenium from the sour water stream feed.

Example 3

An aqueous stream containing selenocyanate was contacted with a quantity of the sulfur/carbon material described in Example 1. The feed for Run 1 contained about 8.5 ppm oxygen and 3.0 ppm selenocyanate.

In Run 2, nitrogen was bubbled through the feed for Run 1 prior to contact with the sulfur/carbon material to lower the feed oxygen from about 8.5 ppm to about 0.02 ppm.

After 22 hours on stream, the selenium removal efficiency for Run 1 was about 54% while the selenium removal efficiency for Run 2 was about 98%. Thus, the removal of oxygen from a feed containing selenocyanate results in a significant increase in selenium removal.

Example 4

Run 1

An aqueous stream containing 3360 ppb selenocyanate was contacted with a quantity of the sulfur/carbon material of Example 1.

Run 2

An aqueous stream containing 3350 ppb selenocyanate was contacted with a quantity of a virgin carbon material obtained from Nucon International, Inc.

For each run, the velocity of the feed was 3 gpm/ft$^2$ and the temperature was 70° C.

The results of the runs are shown in Table 3 below.

TABLE 3

| Run 1 (Sulfur/Carbon) | | | Run 2 (Virgin Carbon) | | |
| --- | --- | --- | --- | --- | --- |
| Time On Stream (hrs) | Se (ppb) | % removed | Time On Stream (hrs) | Se (ppb) | % removed |
| 1 | 225 | 93.3 | 1 | 499 | 85.1 |
| 2 | 303 | 91.0 | 2 | 837 | 75.0 |
| 3 | 370 | 89.0 | 3 | 1250 | 62.7 |
| 4 | 435 | 87.1 | 4 | 1680 | 49.9 |
| 5 | 420 | 87.5 | 5 | 2070 | 38.2 |
| 6 | 439 | 86.9 | 6 | 2240 | 33.1 |
| 7 | 472 | 86.0 | 7 | 2370 | 29.3 |
| 8 | 503 | 85.0 | 8 | 2550 | 23.9 |

As can be seen from the above data in Table 3, the use of a sulfur/carbon material is significantly more effective in selenium removal as compared to virgin carbon.

Example 5

A sulfur/carbon material was prepared by admixing 15 grams of sulfur with 35 grams of Nuchar® virgin carbon obtained from MeadWestvaco Corporation.

The admixture was heated at a temperature between about 170° C. and about 213° C., with occasional mixing of the admixture, to form a sulfur/carbon material containing about 30 wt. % sulfur.

Quantities of an aqueous feed containing around 4000 ppb selenocyanate were separately contacted with a quantity of Nuchar® virgin carbon, with a quantity of virgin carbon obtained from Norit Americas, Inc., with the 30 wt. % sulfur/carbon material described above, and with the sulfur/carbon material of Example 1. Results of the runs are shown in Table 4 below.

TABLE 4

| Material | Se Removal Efficiency after 20 hrs. on stream (%) |
| --- | --- |
| Nuchar ® virgin carbon | ~1 |
| Norit virgin carbon | ~10 |
| 30 wt. % sulfur/carbon | ~26 |
| MERSORB ® - LW sulfur/carbon | ~84 |

As can be seen from Table 4, the sulfur/carbon materials provided much improved selenium removal as compared to virgin carbon.

Example 6

An aqueous feed containing 1000 ppb selenocyanate was contacted with a quantity of the 30% sulfur/carbon material of Example 5 at a LHSV of 1.0 hr.$^{-1}$ and a temperature of 25° C., with and without the addition of ammonium sulfite. The selenium removal efficiency without ammonium sulfite addition was about 15% after about 20 hours on stream, while the selenium removal efficiency with ammonium sulfite addition was greater than 99% after about 20 hours on stream.

Thus, the addition of a sulfite to the aqueous feed, prior to contact with the sulfur/carbon material, can be effective in the removal of selenocyanate from such a stream under certain conditions.

Example 7

An aqueous feed containing 1000 ppb selenite was contacted with a quantity of the 30% sulfur/carbon material of Example 5 at a LHSV of 1.0 hr.$^{-1}$ and a temperature of 25° C., with and without the addition of ammonium sulfite. The selenium removal efficiency without ammonium sulfite addition was less than 1% after about 20 hours on stream, while the selenium removal efficiency with ammonium sulfite addition was about 99% after about 20 hours on stream.

Thus, the addition of a sulfite to the aqueous feed, prior to contact with the sulfur/carbon material, can be effective in the removal of selenite from such a stream.

Example 8

An aqueous stream containing 250 ppb selenium was contacted with several supported sulfur materials. Around 2 grams of sodium sulfite were added per liter of feed prior to contact with the supported sulfur materials. The flow rate was 100 ml/hr. with a LHSV of 1.7 and a temperature of about 21° C. The results are shown in Table 5 below.

TABLE 5

| | Se Removal Efficiency (%) | |
|---|---|---|
| Material | After 2 hours on stream | After 4 hours on stream |
| 30% Sulfur on Pearlite/Alumina | 66.0 | 79.7 |
| 10% Sulfur on Carbon | 80.5 | 24.2 |
| 20% Sulfur on Carbon | 99.2 | 78.5 |
| 30% Sulfur on Carbon | >99.6 | 93.4 |

As can be seen from Table 5, supported sulfur materials are useful in removing selenium from an aqueous selenium stream.

Whereas this invention has been described in terms of the preferred embodiments, reasonable variations and modifications are possible by those skilled in the art. Such modifications are within the scope of the described invention and appended claims.

That which is claimed:

1. A process comprising contacting a feed stream comprising water and at least about 1000 ppb of a selenium compound including selenite with a composition consisting essentially of sulfur and a porous support selected from the group consisting of alumina and carbon for removal of at least a portion of said selenium compound from said feed stream thereby forming a treated stream comprising less selenium than said feed stream; wherein said feed stream is contacted with a sufficient quantity of said composition such that said treated stream contains less than or equal to about 30 wt. % of the selenium contained in said feed stream, on an elemental selenium basis, and said contacting of said feed stream with said composition is at a pH between about 1 to about 8.5, and is in the presence of an activating agent selected from the group consisting of ammonium sulfite, sodium sulfite, potassium sulfite, $H_2SO_3$, sulfur dioxide, and combinations thereof.

2. The process of claim 1 wherein at least about 70 wt. %, on an elemental selenium basis, of said selenium compound is selenite.

3. The process of claim 2 wherein said porous support is carbon.

4. The process of claim 2 wherein said feed stream is contacted with a sufficient quantity of said composition such that said treated stream contains less than or equal to about 5 wt. % of the selenium contained in said feed stream, on an elemental selenium basis.

5. The process of claim 2 wherein the concentration of sulfur of said composition is in the range of from about 1 to about 60 wt. % sulfur.

6. The process of claim 2 wherein the concentration of sulfur of said composition is in the range of from about 10 to about 30 wt. % sulfur.

7. The process of claim 2 wherein said contacting is at a temperature in the range of from about 20° C. to about 100° C.

8. The process of claim 2 wherein said contacting is at a temperature in the range of from about 30° C. to about 80° C.

9. A process comprising contacting a feed stream comprising water and at least about 1000 ppb of a selenium compound including selenocyanate with a composition consisting essentially of sulfur and a porous support selected from the group consisting of alumina and carbon for removal of at least a portion of said selenium compound from said feed stream thereby forming a treated stream comprising less selenium than said feed stream; wherein said feed stream is contacted with a sufficient quantity of said composition such that said treated stream contains less than or equal to about 30 wt. % of the selenium contained in said feed stream, on an elemental selenium basis, and said contacting of said feed stream with said composition is at a pH between about 1 to about 8.5.

10. The process of claim 9 wherein at least about 70 wt. %, on an elemental selenium basis, of said selenium compound is selenocyanate.

11. The process of claim 9 wherein said porous support is carbon.

12. The process of claim 9 wherein said feed stream is contacted with a sufficient quantity of said composition such that said treated stream contains less than or equal to about 5 wt. % of the selenium contained in said feed stream, on an elemental selenium basis.

13. The process of claim 9 wherein said contacting of said feed stream with said composition is at a pH between about 3 to about 5.

14. The process of claim 9 wherein an acid selected from the group consisting of sulfuric acid, $SnCl_2$, $FeCl_2$, $AlCl_3$, and combinations thereof, is added to said feed stream prior to said contacting with said composition.

15. The process of claim 9 wherein said feed stream comprises less than or equal to about 20 ppb oxygen when contacted with said composition.

16. The process of claim 9 wherein said feed stream comprises less than or equal to about 10 ppb oxygen when contacted with said composition.

17. The process of claim 9 wherein the concentration of sulfur of said composition is in the range of from about 1 to about 60 wt. % sulfur.

18. The process of claim 9 wherein the concentration of sulfur of said composition is in the range of from about 10 to about 30 wt. % sulfur.

19. The process of claim 9 wherein said contacting is at a temperature in the range of from about 20° C. to about 100° C.

20. The process of claim 9 wherein said contacting is at a temperature in the range of from about 30° C. to about 80° C.

21. The process of claim 9 wherein said feed stream further comprises a contaminant selected from the group consisting of thiosulfate, thiocyanate, chloride, sulfate, sulfite, hydrogen sulfide, organics, phenolics and combinations thereof, and wherein said contacting is at a temperature in the range of from about 50° C. to about 100° C., and at a pH between about 2 to about 4.

22. The process of claim 9 wherein said feed stream further comprises a contaminant selected from the group consisting of thiosulfate, thiocyanate, chloride, sulfate, sulfite, organics, phenolics and combinations thereof, and wherein said contacting is at a temperature in the range of from about 65° C. to about 100° C., and at a pH between about 2 to about 3.

* * * * *